United States Patent
Tang (10) Patent No.: US 11,363,619 B2
(45) Date of Patent: Jun. 14, 2022

(54) RELAY NETWORK DUPLEX COORDINATION METHOD AND RELAY NODE DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 10 days.

(21) Appl. No.: 16/925,015

(22) Filed: Jul. 9, 2020

(65) Prior Publication Data

US 2020/0344784 A1 Oct. 29, 2020

Related U.S. Application Data

(63) Continuation of application No. PCT/CN2018/071975, filed on Jan. 9, 2018.

(51) Int. Cl.
*H04W 4/00* (2018.01)
*H04W 72/12* (2009.01)
(Continued)

(52) U.S. Cl.
CPC ........... *H04W 72/1273* (2013.01); *H04L 5/14* (2013.01); *H04W 4/70* (2018.02); *H04W 72/042* (2013.01);
(Continued)

(58) Field of Classification Search
None
See application file for complete search history.

(56) References Cited

U.S. PATENT DOCUMENTS

| 5,559,795 A | 9/1996 | Ahl |
| 2007/0110005 A1* | 5/2007 | Jin ........................ H04W 92/20 370/335 |

(Continued)

FOREIGN PATENT DOCUMENTS

| CN | 1105790 | 7/1995 |
| CN | 101784125 | 7/2010 |

(Continued)

OTHER PUBLICATIONS

EPO, Extended European Search Report for EP 18900132.4, dated Nov. 24, 2020.

(Continued)

*Primary Examiner* — Zewdu A Beyen
(74) *Attorney, Agent, or Firm* — Hodgson Russ LLP (57) ABSTRACT

Embodiments of the present application provide a relay network duplex coordination method and a relay node device. The method includes: according to configuration information, receiving, by a first node device, on a first time domain resource a first message sent by a second node device, and sending a second message to a third node device on a second time domain resource; wherein the configuration information indicates the first time domain resource and/or the second time domain resource, the second node device is a parent node of the first node device, and the third node device is a child node of the first node device.

13 Claims, 4 Drawing Sheets

(51) Int. Cl.
  *H04W 4/70* (2018.01)
  *H04W 76/28* (2018.01)
  *H04W 76/27* (2018.01)
  *H04L 5/14* (2006.01)
  *H04W 72/04* (2009.01)
  *H04W 80/02* (2009.01)

(52) U.S. Cl.
  CPC ... *H04W 72/0446* (2013.01); *H04W 72/1257* (2013.01); *H04W 76/27* (2018.02); *H04W 76/28* (2018.02); *H04W 80/02* (2013.01)

(56) References Cited

U.S. PATENT DOCUMENTS

| | | | |
|---|---|---|---|
| 2012/0147810 A1 | 6/2012 | Wang et al. | |
| 2014/0071883 A1 | 3/2014 | Abraham et al. | |
| 2016/0219443 A1 | 7/2016 | Lee et al. | |
| 2020/0245338 A1* | 7/2020 | Baldemair | H04W 76/11 |

FOREIGN PATENT DOCUMENTS

| | | |
|---|---|---|
| CN | 101841920 | 9/2010 |
| CN | 102378329 | 3/2012 |
| EP | 2543219 | 1/2013 |
| EP | 3297379 A1 | 3/2018 |
| JP | 2012523197 | 9/2012 |
| KR | 20110119777 | 11/2011 |
| TW | 201735716 | 10/2017 |
| WO | 9315565 | 8/1993 |
| WO | 2016163541 | 10/2016 |
| WO | 2016184296 A1 | 11/2016 |
| WO | 2017196611 | 11/2017 |

OTHER PUBLICATIONS

AT&T et al, "New SID Proposal: STudy on Integrated Access and Backhaul for NR", 888112 3GPP TSG RAN Meeting #75, RP-170831, 5 pages, Mar. 6, 2017, Croatia.
ISDEC, Office Action for CA Application No. 3087902, dated Aug. 12, 2021.
EPO, Communication for EP Application No. 18900132.4, dated Aug. 26, 2021.
IPI, Office Action for IN Application No. 202017032284, dated Jun. 15, 2021.
WIPO, ISR for PCT/CN2018/071975, dated Sep. 29, 2018.
Samsung, "Dynamic resource allocation for Integrated Access and Backhaul," 3GPP TSG RAN WG1#90, R1-1714497, Aug. 2017.
JPO, Office Action for JP Application No. 2020-537699, dated Nov. 19, 2021.
KIPO, Office Action for KR Application No. 10-2020-7022867, dated Jan. 19, 2022.
CNIPA, Notice of Priority Review of Patent Application for CN Application No. 202011533506.0, dated Mar. 16, 2022.
CNIPA, First Office Action for CN Application No. 202011533506.0, dated Mar. 30, 2022.

* cited by examiner

RELAY NETWORK DUPLEX COORDINATION METHOD AND RELAY NODE DEVICE

CROSS-REFERENCE TO RELATED APPLICATION

This application is a continuation of International Application No. PCT/CN2018/071975, filed Jan. 9, 2018, the entire disclosure of which is incorporated herein by reference.

TECHNICAL FIELD

Embodiments of the present disclosure generally relate to communication technologies, and more particularly, to methods for duplex coordination in a relay network and relay node devices.

BACKGROUND

In Release 10, the duplex coordinated scheduling between a fixed node device (donor Evolutional Node B, donor eNB) and a relay node device (relay eNB) in uplink and downlink directions is performed on some pre-configured fixed subframes (time domain resources) to conduct backhaul link communications, and this cannot meet the requirements for the backhaul link communication in the 5-Generation New Radio (5G NR) technologies.

SUMMARY

Embodiments of the present disclosure provide a method for duplex coordination in a relay network and a relay node device. The relay node device can a message sent by a parent node device of the relay node device according to dynamically configured first time domain resource, and send a message to a child node device of the relay node device according to dynamically configured second time domain resource, thereby meeting the requirements for backhaul link communication in 5G NR technologies.

According to a first aspect, embodiments of the present disclosure provide a method for duplex coordination in a relay network, including:

according to configuration information, receiving, by a first node device, on a first time domain resource a first message sent by a second node device, and sending a second message to a third node device on a second time domain resource;

wherein the configuration information indicates the first time domain resource and/or the second time domain resource, the second node device is a parent node of the first node device, and the third node device is a child node of the first node device.

Therefore, in the method for duplex coordination in the relay network according to embodiments of the present disclosure, the first node device may receive the message sent by a parent node device of the first node device on the first time domain resource according to the dynamic configuration information, and send a message to a child node device of the first node device on the second time domain resource, thereby meeting the requirements for backhaul link communication in 5G NR technologies.

According to an implementation of the first aspect, the first time domain resource and/or the second time domain resource are downlink time domain resources.

According to an implementation of the first aspect, the first time domain resource and/or the second time domain resource include flexible time slot resources.

According to an implementation of the first aspect, the first time domain resource and the second time domain resource do not overlap each other.

According to an implementation of the first aspect, the second time domain resource is part or all of a third time domain resource, and the third time domain resource is a downlink time domain resource other than the first time domain resource.

The first time domain resource and the second time domain resource may not overlap with each other, so that the first node device may receive on the first time domain resource the message sent by the parent node device of the first node device and simultaneously send the message to the child node device of the first node device on the second time domain resource.

According to an implementation of the first aspect, the first time domain resource and the second time domain resource partially or completely overlap one another.

According to an implementation in the first aspect, according to configuration information, receiving, by a first node device, on a first time domain resource a first message sent by a second node device, and sending a second message to a third node device on a second time domain resource includes:

receiving, by the first node device, the first message sent by the second node device on the first time domain resource in preference.

The first time domain resource may partially or completely overlap with the second time domain resource. Under such condition, the first node device preferentially uses the first time domain resource to receive the message sent by the parent node device of the first node device, so that the first node device can preferentially schedule resources for message reception.

According to an implementation of the first aspect, according to configuration information, receiving, by a first node device, on a first time domain resource a first message sent by a second node device, and sending a second message to a third node device on a second time domain resource includes:

sending, by the first node device, the second message to the third node device in a region of the second time domain resource that does not overlap with the first time domain resource in preference.

The first time domain resource may partially or completely overlap the second time domain resource. Under such condition, the first node device preferentially uses a region of the second time domain resource that does not overlap with the first time domain resource to send the message to the child node device of the first node device. Therefore, the first node device may preferentially schedule downlink time domain resources in the non-overlapping region for message transmission.

According to an implementation of the first aspect, according to configuration information, receiving, by a first node device, on a first time domain resource a first message sent by a second node device, and sending a second message to a third node device on a second time domain resource includes:

if discontinuous reception (DRX) configuration information indicates that it is not needed to receive the first message sent by the second node device on the first time domain resource, sending, by the first node device, the second message to the third node device on the second time domain resource, wherein the DRX configuration information indicates that the first node device receives a message during running of an inactivity timer or during running of an on duration timer, and the first node device rejects to receive the message if the inactivity timer is expired or the on duration timer is expired.

According to an implementation of the first aspect, the configuration information includes first configuration information and second configuration information, the first configuration information indicates the first time domain resource, and the second configuration information indicates the second time domain resource.

According to an implementation of the first aspect, if the first message and/or the second message are downlink reference signals or system messages:

according to configuration information, receiving, by a first node device, on a first time domain resource a first message sent by a second node device, and sending a second message to a third node device on a second time domain resource, includes:

receiving, by the first node device, the first message sent by the second node device in a region of the first time domain resource that does not overlap with the second time domain resource, and/or, sending, by the first node device, the second message to the third node device in a region of the second time domain resource that does not overlap with the first time domain resource.

The first node device receives the downlink reference signal or system message sent by the parent node device of the first node device in a region of the first time domain resource that does not overlap with the second time domain resource, and the first node device sends the downlink reference signal or system message to the child node device of the first node device in a region of the second time domain resource that does not overlap with the first time domain resource, thereby ensuring reliable transmission of the downlink reference signal or the system message.

According to an implementation of the first aspect, the method further includes:

sending, by the first node device, the first time domain resource, and/or the second time domain resource, and/or an overlapping region of the first time domain resource and the second time domain resource, and/or a non-overlapping region of the first time domain resource and the second time domain resource to the third node device.

The first node device sends time domain resources to the child node device of the first node device, so that the child node device can determine the time domain resource for receiving the messages sent by the first node device, thereby ensuring reliable transmission.

According to an implementation of the first aspect, according to configuration information, receiving, by a first node device, on a first time domain resource a first message sent by a second node device, and sending a second message to a third node device on a second time domain resource includes:

according to the configuration information and DRX configuration information, receiving, by the first node device, the first message sent by the second node device on the first time domain resource, and sending the second message to the third node device on the second time domain resource;

wherein, on a downlink time domain resource other than the first time domain resource, the first node device ignores the DRX configuration information indicating that the first node device receives the first message, and refuses to receive the first message; and wherein the DRX configuration information indicates that the first node device receives a message during running of an inactivity timer or during running of an on duration timer, and the first node device rejects to receive the message if the inactivity timer is expired or the on duration timer is expired.

When the first node device receives messages, the first node device gives priority to the time domain resource as indicated by the configuration information, and then considers the DRX configuration information. Thus, when there is conflict between the configuration information and the DRX configuration information, the conflict can be resolved.

According to an implementation of the first aspect, before according to configuration information, receiving, by a first node device, on a first time domain resource a first message sent by a second node device, and sending a second message to a third node device on a second time domain resource, the method further includes:

receiving, by the first node device, the configuration information sent by a fourth node device, wherein the fourth node device is the second node device, or an anchor node device, or an access network device, or a core network device.

According to an implementation of the first aspect, receiving, by the first node device, the configuration information sent by a fourth node device, includes:

receiving, by the first node device, the configuration information sent by the fourth node device through Radio Resource Control (RRC), or a Media Access Control (MAC) Control Element (CE), or Downlink Control Information (DCI).

According to an implementation of the first aspect, the method further includes:

performing, by the first node device, terminal-to-terminal (D2D) communication with a fifth node device on a fifth time domain resource;

wherein the fifth time domain resource is configured by a sixth node device, and the sixth node device is the second node device, or an anchor node device, or an access network device, or a core network device.

According to a second aspect, embodiments of the present disclosure provide a method for duplex coordination in a relay network, the method including:

receiving, by a first node device, time domain resource information sent by a second node device, wherein the second node device is a parent node of the first node device; and receiving, by the first node device, a message sent by the second node device according to the time domain resource information.

Therefore, in the method for duplex coordination in a relay network in the embodiments of the present disclosure, the first node device receives the time domain resource information sent by the parent node device of the first node device, so that the first node device can determine the time domain resource for receiving the message sent by the parent node device, thereby ensuring reliable transmission.

According to an implementation of the second aspect, the time domain resource information includes a first time domain resource, and/or a second time domain resource, and/or an overlapping region of the first time domain resource and the second time domain resource, and/or a non-overlapping region of the first time domain resource and the second time domain resource;

wherein the second node device receives a message sent by a third node device through the first time domain resource, and sends a message to the first node device through the second time domain resource, and the third node device is a parent node of the second node device.

According to an implementation of the second aspect, if the time domain resource information includes the first time domain resource:

receiving, by the first node device, a message sent by the second node device according to the time domain resource information includes:

receiving, by the first node device, the message sent by the second node device on a time domain resource other than the first time domain resource.

According to an implementation of the second aspect, if the time domain resource information includes the first time domain resource, and/or the second time domain resource:

receiving, by the first node device, a message sent by the second node device according to the time domain resource information includes:

receiving, by the first node device, the message sent by the second node device on the second time domain resource.

According to an implementation of the second aspect, if the time domain resource information includes the first time domain resource, and/or the second time domain resource, and/or the overlapping region of the first time domain resource and the second time domain resource:

receiving, by the first node device, a message sent by the second node device according to the time domain resource information includes:

receiving, by the first node device, the message sent by the second node device on a third time domain resource in preference, wherein the third time domain resource is a time domain resource in the second time domain resource other than the overlapping region of the first time domain resource and the second time domain resource.

According to an implementation of the second aspect, if the time domain resource information includes the first time domain resource, and/or the second time domain resource, and/or the overlapping region of the first time domain resource and the second time domain resource, and/or the non-overlapping region of the first time domain resource and the second time domain resource, receiving, by the first node device, a message sent by the second node device according to the time domain resource information includes:

receiving, by the first node device, the message sent by the second node device on a region in the second time domain resource that does not overlap with the first time domain resource in preference.

According to a third aspect, embodiments of the present disclosure provide a relay node device. The relay node device includes modules or units configured to execute the method in the first aspect or any implementation of the first aspect.

According to a fourth aspect, embodiments of the present disclosure provide a relay node device. The relay node device includes modules or units configured to execute the method in the second aspect or any implementation of the second aspect.

According to a fifth aspect, a relay node device is provided. The relay node device includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution causes the processor to execute the method in the first aspect or any implementation of the first aspect.

According to a sixth aspect, a relay node device is provided. The relay node device includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution causes the processor to execute the method in the second aspect or any implementation of the second aspect.

According to a seventh aspect, there is provided a computer storage medium, in which program codes are stored, and the program codes are configured to instruct a computer to execute the instructions for performing the methods described in the above aspects.

According to an eighth aspect, a computer program product including instructions is provided. When the instructions are executed on a computer, the computer is caused to perform the methods described in the above aspects.

DETAILED DESCRIPTION

The technical solutions in the embodiments of the present disclosure will be described clearly and completely in conjunction with the drawings in the embodiments of the present disclosure.

The technical solutions of embodiments of the present disclosure can be applied to a 5G NR communication system.

Figure 1:
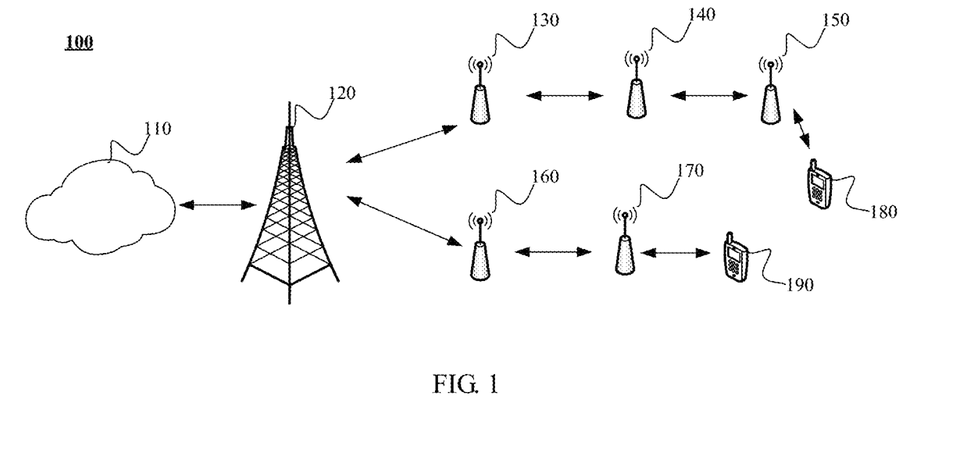
FIG. 1 is a schematic diagram of an application scenario according to an embodiment of the present disclosure.

FIG. 1 is a schematic diagram of an application scenario according to an embodiment of the present invention.

As shown in FIG. 1, the communication system 100 may include a core network device 110, an anchor node device 120, relay node devices 130-170, and terminal devices 180-190. In this communication system 100, a topological network centered on the core network device 110 can be established. The core network device 110 can establish a communication connection with the terminal device 180 through the anchor node device 120, the relay node device 130, the relay node device 140, and the relay node device 150, and the core network device 110 can establish a communication connection with the terminal device 190 through the anchor node device 120, the relay node device 160 and the relay node device 170.

It should be understood that embodiments of the present disclosure are exemplarily described with the communication system 100, but the embodiments of the present disclosure are not limited thereto. That is to say, the number of relay node devices and the number of terminal devices in the embodiments of the present disclosure may vary depending on actual needs.

The core network device 110 may be a 5G Core (5G Core, 5GC) device, for example, Access and Mobility Management Function (AMF), or for example, Session Management Function (SMF), or for example, User Plane Function (UPF).

The anchor node device 120 may be a base station or an access network device that directly performs wired communication with the core network device 110. The anchor node device 120 can provide communication coverage for a specific geographic area, and can communicate with relay node devices or terminal devices (e.g., UEs) within the coverage. In some embodiments, the anchor node device 120 may be a base station (gNB) in a New Radio (NR) system, or a wireless controller in a Cloud Radio Access Network (CRAN), or the anchor node device 120 may be a relay station, an access point, a vehicle-mounted device, a wearable device, or a network device in a future evolved Public Land Mobile Network (PLMN).

The relay node devices (130-170) can implement data or signaling forwarding between the anchor node device and the terminal devices. For example, the relay node device 130 connects the anchor node device 120 and the relay node device 140 for forwarding data or signaling between the anchor node device 120 and the relay node device 140 (terminal device 180). The relay node device can provide communication coverage for a specific geographic area, and can communicate with other relay node devices or terminal devices in the coverage. In some embodiments, the relay node device may be a base station (gNB) in an NR system, or a relay station, an access point, a vehicle-mounted device, a wearable device, or a network device in a future evolved PLMN.

In some embodiments, the communication connection between the relay node device and the anchor node device 120 can be represented by the number of hops. For example, the number of hops between the relay node device 130 and the anchor node device 120 is 1, and the number of hops between the relay node device 150 and the anchor node device 120 is 3.

In some embodiments, the last hop device of the relay node device is its parent node, and the next hop is its child node. For example, the parent node of the relay node device 140 is the relay node device 130, and the child node of the relay node device 140 is the relay node device 150.

In some embodiments, the fewer the number of hops with the anchor node device 120, the higher the priority will be. For example, the relay node device 130 has a higher priority than the relay node device 140. For another example, the relay node device 130 has the same priority as the relay node device 160.

The terminal device (180-190) may be mobile or fixed. In some embodiments, the terminal device may refer to an access terminal, User Equipment (UE), user unit, user station, mobile station, mobile terminal, remote station, remote terminal, mobile device, user terminal, terminal, wireless communication device, user agent or user device. The access terminal may be a cellular phone, a cordless phone, a Session Initiation Protocol (SIP) phone, a Wireless Local Loop (WLL) station, a Personal Digital Assistant (PDA), or a handheld device having wireless communication function, a computing device, or other processing device connected to wireless modems, an in-vehicle device, a wearable device, a terminal device in 5G NR networks, or a terminal device in future evolved PLMN.

FIG. 1 exemplarily shows one core network device, one anchor node device, five relay node devices, and two terminal devices. In other embodiments, the wireless communication system 100 may include more anchor node devices, and there are other numbers of relay node devices, and each relay node device may include other numbers of terminal devices within the coverage, and embodiments of the present disclosure do not impose specific limitations on this.

In some embodiments, the wireless communication system 100 may also include other network entities such as Session Management Function (SMF), Unified Data Management (UDM), Authentication Server Function (AUSF), and so on, and embodiments of the present disclosure do not impose specific limitations on this.

It should be understood that the terms "system" and "network" are often used interchangeably herein. The term "and/or" used herein describes an association relationship between associated objects, indicating that there can be three relationships. For example, A and/or B can mean: A exists alone, both A and B exist, and B exist alone. In addition, the character "/" generally indicates that the related objects before and after "/" are in an "or" relationship.

Figure 2:
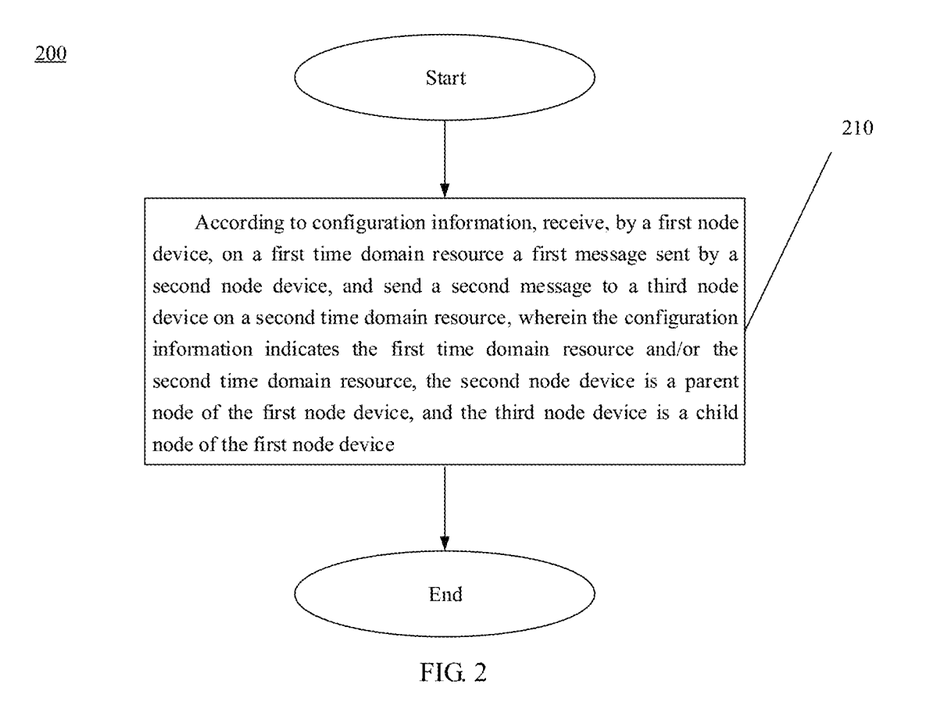
FIG. 2 is a schematic flowchart of a method for duplex coordination in relay network according to an embodiment of the present disclosure.

FIG. 2 is a schematic flowchart of a method 200 for relay network duplex coordination according to an embodiment of the present disclosure. The method 200 can be applied to the system shown in FIG. 1, but is not limited thereto. The method 200 includes at least part of the following contents.

In 210, according to configuration information, the first node device receives on a first time domain resource a first message sent by a second node device, and sends a second message to a third node device on a second time domain resource. The configuration information indicates the first time domain resource and/or the second time domain resource, the second node device is a parent node of the first node device, and the third node device is a child node of the first node device.

For example, the first message may be downlink data, a paging message, a system message, a downlink reference signal, or some control signaling messages, and embodiments of the present disclosure do not impose specific limitations on this.

For example, the second message may be downlink data, a paging message, a system message, a downlink reference signal, or some control signaling messages, and embodiments of the present disclosure do not impose specific limitations on this.

The first node device may receive the first message sent by the second node device on the first time domain resource and at the same time send the second message to the third node device on the second time domain resource.

The first time domain resource and/or the second time domain resource are downlink time domain resources.

According to some embodiments, the first time domain resource and/or the second time domain resource include flexible slot resources (flexible slots).

According to some embodiments, the first time domain resource and the second time domain resource do not overlap each other.

According to some embodiments, the second time domain resource is part or all of a third time domain resource, and the third time domain resource is a downlink time domain resource other than the first time domain resource.

Figure 3:
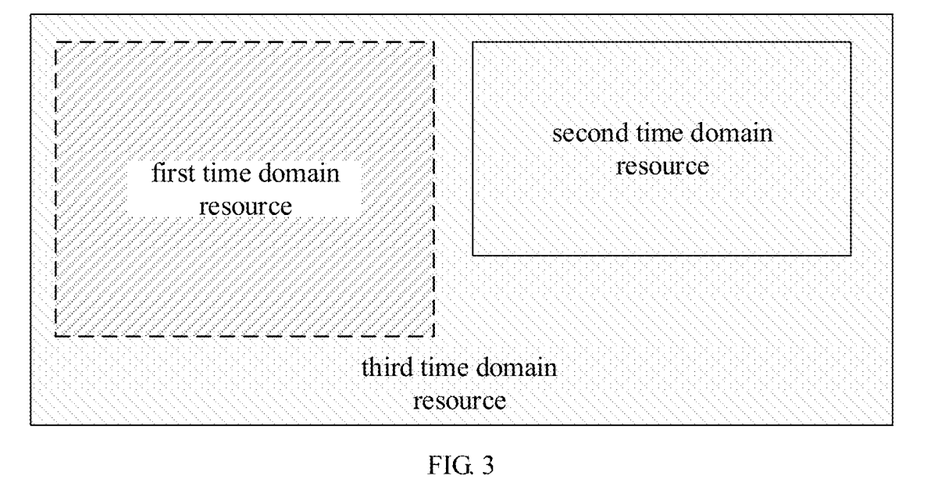
FIG. 3 is a schematic diagram showing two time domain resources that do not overlap with each other according to an embodiment of the present disclosure.

For example, as shown in FIG. 3, the first time domain resource and the second time domain resource do not overlap each other, the second time domain resource is a part of the third time domain resource, and the first time domain resource and the third time domain resource constitute all downlink time domain resources.

Therefore, the first time domain resource and the second time domain resource may not overlap each other, and thus the first node device can receive on the first time domain resource the message sent by its parent node device, and simultaneously send on the second time domain resource the message to its child node device.

Figure 4:
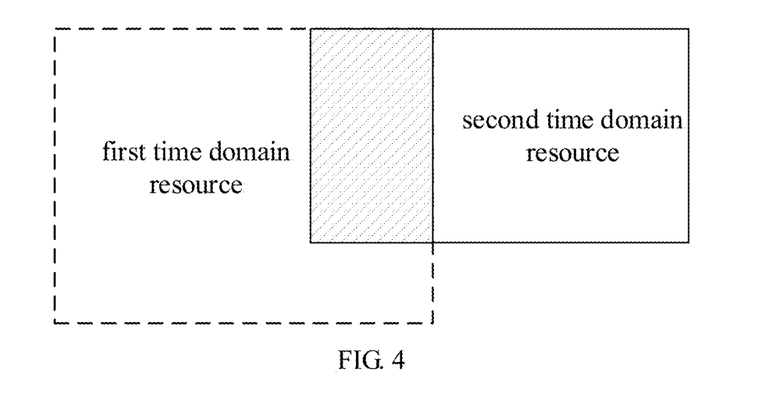
FIG. 4 is a schematic diagram showing two time domain resources overlapping each other according to an embodiment of the present disclosure.

According to some embodiments, the first time domain resource and the second time domain resource partially or completely overlap.

For example, as shown in FIG. 4, the first time domain resource and the second time domain resource partially overlap.

For example, when the first time domain resource partially or completely overlaps with the second time domain resource, the first node device receives the first message sent by the second node device preferentially on the first time domain resource.

Therefore, the first time domain resource may partially or completely overlap with the second time domain resource. Under such condition, the first node device preferentially uses the first time domain resource to receive the message sent by its parent node device, so that the first node device can preferentially schedule resources for message reception.

In some embodiments, while the first node device receives on the first time domain resource the first message sent by the second node device, the third node device may be in a receiving state, for example, the third node device receives a message sent by a parent node other than the first node device.

For example, when the first time domain resource and the second time domain resource partially or completely overlap, the first node device sends the second message to the third node device preferentially in a region of the second time domain resource that does not overlap with the first time domain resource.

Therefore, the first time domain resource may partially or completely overlap with the second time domain resource. Under such condition, the first node device preferentially uses the region of the second time domain resource which does not overlap with the first time domain resource to send the message to the child node device of the first node device, and thus the first node device can preferentially schedule the downlink time domain resources in the non-overlapping region to send the message.

In some embodiments, if the DRX configuration information indicates that it is not needed to receive the first message sent by the second node device on the first time domain resource, the first node device sends the second message to the third node device on the second time domain resource.

In some embodiments, when the first time domain resource and the second time domain resource partially or completely overlap, the configuration information includes first configuration information and second configuration information, the first configuration information indicates the first time domain resource, and the second configuration information indicates the second time domain resource.

In some embodiments, the first time domain resource and the second time domain resource partially or completely overlap. If the first message and/or the second message are downlink reference signals or system messages, the first node device receives the first message sent by the second node device in a region of the first time domain resource that does not overlap with the second time domain resource, and/or, the first node device sends the second message to the third node device in a region of the second time domain resource that does not overlap with the first time domain resource.

Therefore, in the region of the first time domain resource that does not overlap with the second time domain resource, the first node device receives the downlink reference signal or system message sent by its parent node device; and, in the region of the second time domain that does not overlap with the first time domain resource, the first node device sends the downlink reference signal or system message to its child node device. In this way, the reliable transmission of the downlink reference signal or system message can be ensured.

In some embodiments, the first node device sends the first time domain resource, and/or the second time domain resource, and/or the overlapping region of the first time domain resource and the second time domain resource, and/or the non-overlapping region of the first time domain resource and the second time domain resource to the third node device.

If the first node device sends the first time domain resource to the third node device, the third node device receives on a time domain resource other than the first time domain resource the message sent by the first node device.

If the first node device sends the first time domain resource and/or the second time domain resource to the third node device, the third node device receives on the second time domain resource the message sent by the first node device.

If the first node device sends the first time domain resource and/or the second time domain resource and/or the overlapping region of the first time domain resource and the second time domain resource region to the third node device, the third node device receives the message sent by the first node device preferentially on the third time domain resource. The third time domain resource is a time domain resource in the second time domain resource other than the overlapping region of the first and second time domain resources.

If the first node device sends the first time domain resource and/or the second time domain resource and/or the overlapping region of the first time domain resource and the second time domain resource region, and/or the non-overlapping region of the first time domain resource and the second time domain resource to the third node device, the third node device preferentially uses the region in the second time domain resource that does not overlap with the first time domain resource to receive the message sent by the first node device.

Therefore, the first node device sends the time domain resource to its child node device, so that its child node device can determine the time domain resource for receiving the message sent by the first node device, thereby ensuring reliable transmission.

In some embodiments, according to the configuration information and the DRX configuration information, the first node device receives on the first time domain resource the first message sent by the second node device, and sends the second message to the third node device on the second time domain resource.

On a downlink time domain resource other than the first time domain resource, the first node device ignores the DRX configuration information indicating that the first node device receives the first message, and refuses to receive the first message.

The DRX configuration information indicates that the first node device receives a message during running of an inactivity timer or during running of an on duration timer, and the first node device rejects to receive the message if the inactivity timer is expired or the on duration timer is expired.

For example, if the first node device determines that the first message sent from the second node device needs to be received on the first time domain resource according to the DRX configuration information, and the configuration information indicates that there is no time domain resource for the first message, the first node device refuses to receive the first message.

In some embodiments, the priority of the configuration information is greater than the priority of the DRX configuration information.

Therefore, when receiving the message, the first node device gives priority to the time domain resource indicated by the configuration information, and secondly considers the DRX configuration information. In this way, when the configuration information and the DRX configuration information conflict, the conflict can be resolved.

In some embodiments, the first node device receives the configuration information sent by a fourth node device, and the fourth node device is the second node device, or an anchor node device, or an access network device, or a core network device.

In some embodiments, the first node device receives the configuration information sent by the fourth node device through RRC, or MAC CE, or DCI.

In some embodiments, the method 200 further includes:
performing, by the first node device, D2D communication with the fifth node device on a fifth time domain resource, wherein the fifth time domain resource is configured by a sixth node device, and the sixth node device is the second node device, or an anchor node device, or an access network device, or a core network device.

The first node device and the fifth node device are node devices of the same priority.

In some embodiments, the fifth time domain resource may be a sidelink time domain resource.

Therefore, in the method for duplex coordination in a relay network in the embodiments of the present disclosure, the first node device may receive the message sent by the parent node device on the first time domain resource according to the dynamic configuration information, and the first node device may send the message to the child node device of the first node device on the second time domain resource, thereby meeting the requirements for backhaul link communication in 5G NR technologies.

Figure 5:
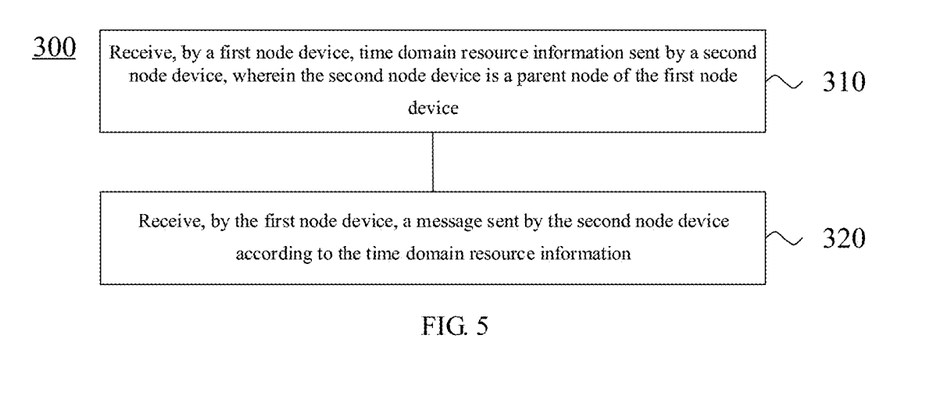
FIG. 5 is a schematic flowchart of a method for duplex coordination in a relay network according to an embodiment of the present disclosure.

FIG. 5 is a schematic flowchart of a method 300 for relay network duplex coordination according to an embodiment of the present disclosure. The method 300 can be applied to the system shown in FIG. 1, but is not limited thereto. The method 300 includes at least part of the following contents.

In 310, a first node device receives time domain resource information sent by a second node device. The second node device is a parent node of the first node device.

In 320, the first node device receives a message sent by the second node device according to the time domain resource information.

In some embodiments, the time domain resource information includes a first time domain resource, and/or a second time domain resource, and/or an overlapping region of the first time domain resource and the second time domain resource, and/or a non-overlapping region of the first time domain resource and the second time domain resource.

The second node device receives a message sent by a third node device through the first time domain resource, and sends a message to the first node device through the second time domain resource, and the third node device is a parent node of the second node device.

In some embodiments, if the time domain resource information includes the first time domain resource:
receiving, by the first node device, a message sent by the second node device according to the time domain resource information includes:
receiving, by the first node device, the message sent by the second node device on a time domain resource other than the first time domain resource.

In some embodiments, if the time domain resource information includes the first time domain resource, and/or the second time domain resource:
receiving, by the first node device, a message sent by the second node device according to the time domain resource information includes:
receiving, by the first node device, the message sent by the second node device on the second time domain resource.

In some embodiments, if the time domain resource information includes the first time domain resource, and/or the second time domain resource, and/or the overlapping region of the first time domain resource and the second time domain resource:
receiving, by the first node device, a message sent by the second node device according to the time domain resource information includes:
receiving, by the first node device, the message sent by the second node device preferentially on the third time domain resource, wherein third time domain resource is a time domain resource in the second time domain resource other than the overlapping region of the first time domain resource and the second time domain resource.

In some embodiments, if the time domain resource information includes the first time domain resource, and/or the second time domain resource, and/or the overlapping region of the first time domain resource and the second time domain resource, and/or the non-overlapping region of the first time domain resource and the second time domain resource:
receiving, by the first node device, a message sent by the second node device according to the time domain resource information includes:
receiving, by the first node device, the message sent by the second node device preferentially on a region in the second time domain resource that does not overlap with the first time domain resource.

It should be understood that, for the steps in the method 300 for relay network duplex coordination, reference may be made to the related description of the corresponding steps in the method 200 for relay network duplex coordination, and for the sake of brevity, repeated descriptions are omitted here.

Therefore, in the method for relay network duplex coordination according to embodiments of the present disclosure, the first node device receives time domain resource information sent by its parent node device, so that the first node device can determine the time domain resource for receiving the message sent by its parent node device, thereby ensuring reliable transmission.

Figure 6:
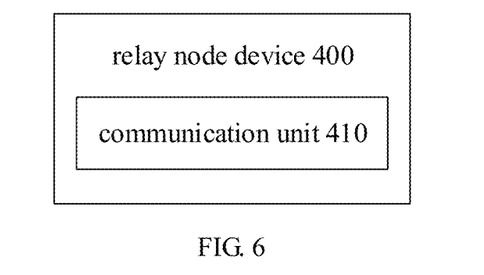
FIG. 6 is a schematic block diagram of a relay node device according to an embodiment of the present disclosure.

FIG. 6 is a schematic block diagram of a relay node device 400 according to an embodiment of the present disclosure. As shown in FIG. 6, the relay node device 400 includes a communication unit 410. The communication unit 410 is configured to, according to configuration information, receive on a first time domain resource a first message sent by a second node device, and sending a second message to a third node device on a second time domain resource. The configuration information indicates the first time domain resource and/or the second time domain resource, the second node device is a parent node of the relay node device, and the third node device is a child node of the relay node device.

It should be understood that the relay node device 400 may correspond to the first node device in the method 200, and may implement the corresponding operations implemented by the first node device in the method 200. For the sake of brevity, repeated descriptions are omitted here.

Figure 7:
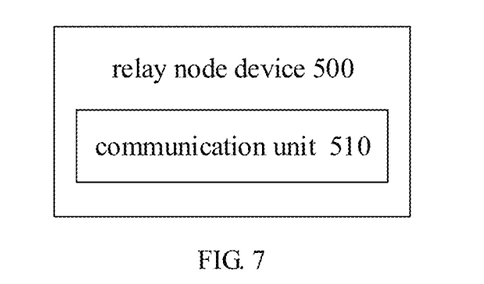
FIG. 7 is a schematic block diagram of a relay node device according to an embodiment of the present disclosure.

FIG. 7 is a schematic block diagram of a relay node device 500 according to an embodiment of the present disclosure. As shown in FIG. 7, the relay node device 500 includes a communication unit 510. The communication unit 510 is configured to receive time domain resource information sent by a second node device, wherein the second node device is a parent node of the relay node device; the communication unit 510 is further configured to receive a message sent by the second node device according to the time domain resource information.

It should be understood that the relay node device 500 may correspond to the first node device in the method 300, and may implement the corresponding operations implemented by the first node device in the method 300. For the sake of brevity, repeated descriptions are omitted here.

Figure 8:
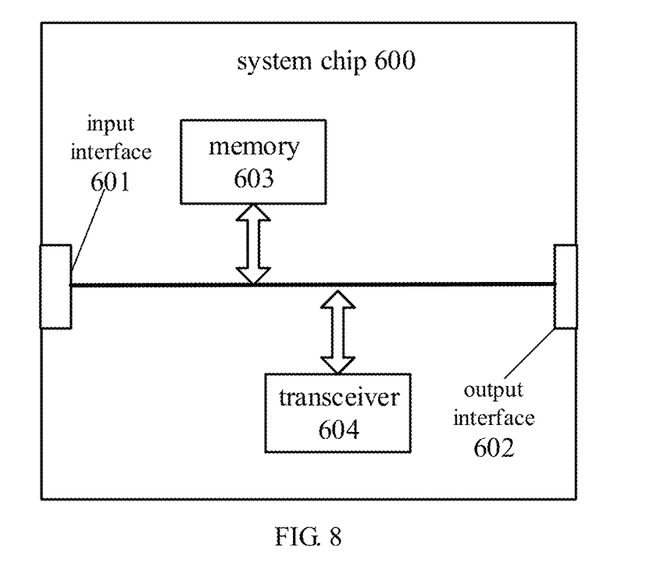
FIG. 8 is a schematic structural diagram of a system chip according to an embodiment of the present disclosure.

FIG. 8 is a schematic structural diagram of a system chip 600 according to an embodiment of the present disclosure. The system chip 600 of FIG. 8 includes an input interface 601, an output interface 602, a processor 603 and a memory 604. The input interface 601, the output interface 602, the processor 603 and the memory 604 can be connected by an internal communication connection line. The processor 603 is configured to execute the codes in the memory 604.

In some embodiments, when the codes are executed, the processor 603 implements the methods executed by the first node device in the method 200. For brevity, repeated descriptions are omitted here.

In some embodiments, when the codes are executed, the processor 603 implements the methods executed by the first node device in the method 300. For brevity, repeated descriptions are omitted here.

Figure 9:
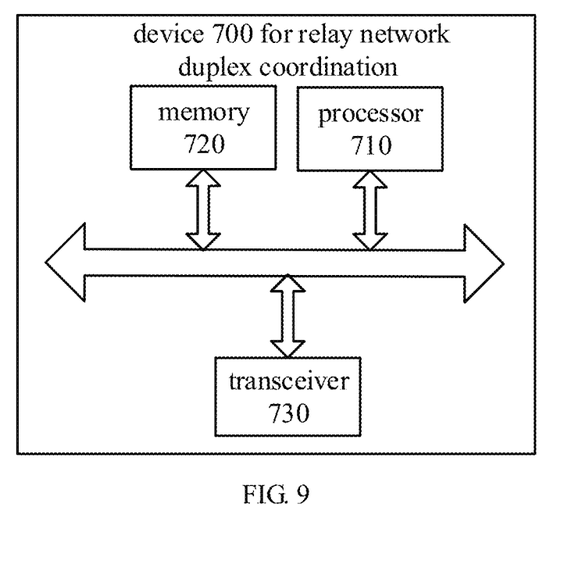
FIG. 9 shows a schematic block diagram of a device for duplex coordination in relay network according to an embodiment of the present disclosure.

FIG. 9 is a schematic block diagram of a communication device 700 according to an embodiment of the present disclosure. As shown in FIG. 9, the communication device 700 includes a processor 710 and a memory 720. The memory 720 may store program codes, and the processor 710 may execute the program codes stored in the memory 720.

In some embodiments, as shown in FIG. 9, the communication device 700 may include a transceiver 730, and the processor 710 may control the transceiver 730 to communicate with devices outside the communication device.

In some embodiments, the processor 710 may call the program codes stored in the memory 720 to perform the corresponding operations of the first node device in the method 200. For the sake of brevity, details are not repeated herein again.

In some embodiments, the processor 710 may call the program codes stored in the memory 720 to perform the corresponding operations of the first node device in the method 300. For the sake of brevity, details are not repeated herein again.

It should be understood that the processor in the embodiments of the present disclosure may be an integrated circuit chip, which has signal processing capabilities. In the implementation process, each step of the foregoing method embodiments may be completed by a hardware integrated logic circuit in a processor or instructions in the form of software. The foregoing processor may be a general-purpose processor, a Digital Signal Processor (DSP), an Application Specific Integrated Circuit (ASIC), a Field Programmable Gate Array (FPGA), or other available programming logic devices, discrete gates or transistor logic devices, discrete hardware components. The methods, steps, and logical block diagrams disclosed in the embodiments of the present disclosure may be implemented or executed. The general-purpose processor may be a microprocessor or the processor may be any conventional processor or the like. The steps of the methods disclosed in conjunction with the embodiments of the present disclosure may be directly embodied and executed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, and a register. The storage medium resides in the memory, and the processor reads the information in the memory and implements the steps of the above method in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be Random Access Memory (RAM), which is used as an external cache. By way of example but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)) and Direct Rambus RAM (DR RAM). It should be noted that the memories described in the system and method embodiments described herein are intended to include, but are not limited to any other suitable types of memories.

Those of ordinary skill in the art will appreciate that the exemplary units and algorithm steps described according to the implementations disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the implementations provided in the present disclosure, it should be understood that the disclosed systems, devices and methods may be implemented in other ways. For example, the device implementations described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for duplex coordination in a relay network, comprising:
　receiving, by a first node device, configuration information sent by a second node device;
　according to the configuration information, receiving, by the first node device, on a first time domain resource a first message sent by a second node device, and sending a second message to a third node device on a second time domain resource;
　wherein the configuration information indicates the first time domain resource and the second time domain resource, the second node device is a parent node of the first node device, and the third node device is a child node of the first node device;
　wherein the configuration information comprises first configuration information and second configuration information, the first configuration information indicates the first time domain resource, and the second configuration information indicates the second time domain resource;
　wherein the first time domain resource and the second time domain resource partially or completely overlap;
　wherein first relay node device prioritizes receiving of the first message sent by the second node device on the first time domain resource.

2. The method according to claim 1, wherein the first time domain resource and/or the second time domain resource are downlink time domain resources.

3. The method according to claim 1, wherein the first time domain resource and/or the second time domain resource comprise flexible time slot resources.

4. The method according to claim 1, wherein sending the second message to the third node device on the second time domain resource comprises:
　if discontinuous reception (DRX) configuration information indicates that it is not needed to receive the first message sent by the second node device on the first time domain resource, sending, by the first node device, the second message to the third node device on the second time domain resource, wherein the DRX configuration information indicates that the first node device receives a message during running of an inactivity timer or during running of an on duration timer, and the first node device rejects to receive the message if the inactivity timer is expired or the on duration timer is expired.

5. The method according to claim 1, wherein if the first message and/or the second message are downlink reference signals or system messages:
　according to configuration information, receiving, by the first node device, on the first time domain resource the first message sent by the second node device, and sending the second message to the third node device on the second time domain resource, comprises:
　receiving, by the first node device, the first message sent by the second node device in a region of the first time domain resource that does not overlap with the second time domain resource, and/or, sending, by the first node device, the second message to the third node device in a region of the second time domain resource that does not overlap with the first time domain resource.

6. The method according to claim 1, further comprising:
　sending, by the first node device, the first time domain resource, and/or the second time domain resource, and/or an overlapping region of the first time domain resource and the second time domain resource, and/or a non-overlapping region of the first time domain resource and the second time domain resource to the third node device.

7. The method according to claim 1, wherein according to configuration information, receiving, by a first node device, on a first time domain resource a first message sent by a second node device, and sending a second message to a third node device on a second time domain resource comprises:
　according to the configuration information and DRX configuration information, receiving, by the first node device, the first message sent by the second node device on the first time domain resource, and sending the second message to the third node device on the second time domain resource;
　wherein, on a downlink time domain resource other than the first time domain resource, the first node device ignores the DRX configuration information indicating that the first node device receives the first message, and refuses to receive the first message; and wherein the DRX configuration information indicates that the first node device receives a message during running of an inactivity timer or during running of an on duration timer, and the first node device rejects to receive the message if the inactivity timer is expired or the on duration timer is expired.

8. The method according to claim 1, wherein receiving, by the first node device, the configuration information sent by the second node device, comprises:

receiving, by the first node device, the configuration information sent by the second node device through Radio Resource Control (RRC), or a Media Access Control (MAC) Control Element (CE), or Downlink Control Information (DCI).

9. The method according to claim 1, further comprising:

performing, by the first node device, terminal-to-terminal (D2D) communication with a fifth node device on a fifth time domain resource;

wherein the fifth time domain resource is configured by a sixth node device, and the sixth node device is the second node device, or an anchor node device, or an access network device, or a core network device.

10. A relay node device, comprising: a processor, a transceiver, memory and instructions stored in the memory that, when executed by the processor, cause the relay node device to perform:

receiving configuration information sent by a second node device;

according to the configuration information, receiving on a first time domain resource a first message sent by the second node device, and sending a second message to a third node device on a second time domain resource;

wherein the configuration information indicates the first time domain resource and the second time domain resource, the second node device is a parent node of the relay node device, and the third node device is a child node of the relay node device;

wherein the configuration information comprises first configuration information and second configuration information, the first configuration information indicates the first time domain resource, and the second configuration information indicates the second time domain resource;

wherein the first time domain resource and the second time domain resource partially or completely overlap;

wherein relay node device prioritizes receiving of the first message sent by the second node device on the first time domain resource.

11. The relay node device according to claim 10, wherein the first time domain resource and/or the second time domain resource are downlink time domain resources.

12. The relay node device according to claim 10, wherein the first time domain resource and/or the second time domain resource comprise flexible time slot resources.

13. A non-transitory computer readable medium comprising program instructions, which when executed by a processor, causes a first relay node device to perform the following:

receiving configuration information sent by a second node device;

according to the configuration information, receiving on a first time domain resource a first message sent by the second node device, and sending a second message to a third node device on a second time domain resource;

wherein the configuration information indicates the first time domain resource and the second time domain resource, the second node device is a parent node of the first node device, and the third node device is a child node of the first node device;

wherein the configuration information comprises first configuration information and second configuration information, the first configuration information indicates the first time domain resource, and the second configuration information indicates the second time domain resource;

wherein the first time domain resource and the second time domain resource partially or completely overlap;

wherein first relay node device prioritizes receiving of the first message sent by the second node device on the first time domain resource.

* * * * *